United States Patent Office 3,784,501
Patented Jan. 8, 1974

3,784,501
ACRYLIC POLYBLEND POWDER COATING COMPOSITION
Paul H. Pettit, Jr., Wilmington, Del., assignor to E. I. du Pont de Nemours and Company, Wilmington, Del.
No Drawing. Filed Nov. 1, 1972, Ser. No. 302,857
Int. Cl. C08f 29/36, 29/38, 29/46
U.S. Cl. 260—31.6
8 Claims

ABSTRACT OF THE DISCLOSURE

The thermoplastic acrylic polymer powder coating composition comprises finely divided particles having a diameter of 1–75 microns wherein the powder particles are a blend of (A) 50–74.5% by weight of polymethyl methacrylate or a copolymer of methyl methacrylate and an alkyl methacrylate having 4–12 carbon atoms in the alkyl group or a blend of polymethyl methacrylate and a copolymer of methyl methacrylate;
(B) 10–20% by weight of a hydroxy containing acrylic copolymer of methyl methacrylate, an alkyl methacrylate having 2–12 carbon atoms in the alkyl group or an alkyl acrylate having 1–12 carbon atoms in the alkyl group, a hydroxy alkyl acrylate, a methacrylate, and an $\alpha,\beta$-ethylenically unsaturated carboxylic acid;
(C) 15–30% by weight of an organic plasticizer;
(D) 0.5–3% by weight of a cross-linking agent such as an alkylated melamine resin or a block polyisocyanate;

the polymer powder particles have a glass transition temperature of 30–60° C. and a melt viscosity of below 75,000 poises measured at 160° C. and can contain pigments and dyes; the novel acrylic polymer powder coating composition is particularly useful as an exterior finish for automobiles and trucks.

BACKGROUND OF THE INVENTION

This invention is related to the powder coating compositions, and in particular, to a powder coating composition of an acrylic polyblend.

Powder coating compositions utilizing polymeric powders are well known in the art, for example, epoxy resins have been utilized in powder coating compositions as shown in Elbling U.S. 3,039,987, issued June 19, 1962, and Winthrop et al. U.S. 3,102,043, issued Aug. 27, 1963. Also, pigmented acrylic polymer particles have been used as toners for imaging systems as shown in Walkup et al. U.S. 2,638,416, issued May 12, 1953; Insalaco U.S. 2,891,011, issued June 16, 1959, and Clemens et al. U.S. 3,502,582, issued Mar. 24, 1970. However, none of these prior art compositions form a high quality finish which is craze-free, print-free, water-spot resistant, weatherable and has an outstanding appearance as is required for automobile and truck bodies.

In an effort to curb pollution, the automobile and truck manufacturing industry intends to utilize powder coating compositions and the industry demands that these compositions be of a high quality. The novel powder coating composition of this invention utilizes an acrylic polyblend and provides finishes having the properties required by the automobile and truck manufacturing industry.

SUMMARY OF THE INVENTION

The thermoplastic acrylic polymer powder coating composition of this invention comprises finely divided particles that have a particle size of 1–75 microns; the powder particles are an intimately mixed blend of film-forming constituents consisting essentially of (A) 50–74.5% by weight, based on the weight of the film-forming constituents, of polymethyl methacrylate or a methacrylate copolymer of 90–98% by weight, based on the weight of the copolymer of methyl methacrylate and correspondingly 2–10% by weight of an alkyl methacrylate having 2–12 carbon atoms in the alkyl group or a blend of polymethyl methacrylate and the methacrylate copolymer; wherein the polymethyl methacrylate and the methacrylate copolymer have a number average molecular weight of about 65,000–100,000;
(B) 10–20% by weight, based on the weight of the film-forming constituents, of a hydroxyl containing acrylic copolymer of
  (1) 50–80% by weight, based on the weight of the copolymer, of methyl methacrylate,
  (2) 9.5–40% by weight of an alkyl methacrylate having 2–12 carbon atoms in the alkyl group or alkyl acrylate having 1–12 carbon atoms in the alkyl group,
  (3) 0.5–6% by weight of a hydroxy alkyl acrylate or methacrylate having 2–4 carbon atoms in the alkyl groups,
  (4) 0.1–5% by weight of an $\alpha,\beta$-ethylenically unsaturated carboxylic acid, wherein the hydroxyl containing copolymer has a number average molecular weight of about 20,000–40,000;
  (C) 15–30% by weight of an organic plasticizer; and
  (D) 0.5–3.0% by weight of a cross-linking agent of an alkylated melamine resin or a blocked polyisocyanate;

wherein the film-forming constituents have a melt viscosity below 75,000 poises measured at 160° C. and the resulting powder particles have a glass transition temperature of about 30–60° C.

DESCRIPTION OF THE INVENTION

The novel powder coating composition of this invention has powder particles that preferably are 20–50 microns in diameter and the unpigmented powder particles preferably have a melt viscosity of 5,000–60,000 poises measured at 160° C. and a glass transition temperature of 30–45° C.

The melt viscosity of the film-forming constituents is measured by heating the unpigmented powder to 160° C. and applying a shear gradient of $10^{-3}$ reciprocal seconds and the viscosity is measured in poises.

The glass transition temperature of the powder particles is temperature at which the viscosity of the material is $10^{13}$ poises.

The number average molecular weight of polymethyl methacrylate, the methacrylate copolymer and the acrylic copolymer is determined by gel permeation chromatography using polymethyl methacrylate as the standard.

The powder particles can be unpigmented or pigmented, but usually, and preferably, contain about 0.2–50% by weight of pigment. Any of the conventional inorganic pigments, organic pigment dyes and lakes can be used.

By utilizing a blend of polymethyl methacrylate or methacrylate copolymer and acrylic copolymer within the above number average molecular weight ranges set forth and the proper organic plasticizer, a powder coating composition is formed that has a glass transition temperature of 30–60° C. and the polymer has a melt viscosity below 70,000 poises measured at 160° C. This composition gives a finish that not only has good physical properties, but also has an excellent appearance, making the finish particularly well suited for automobiles and trucks. These finishes preferably have a gloss transition temperature between 40–60° C. and are weatherable, craze-free, water-spot resistant and print resistant.

The methyl methacrylate polymer and the methacrylate copolymer are prepared by conventional solution and polymerization techniques using conventional polymerization catalysts. The resulting polymer has a number average molecular weight of about 65,000–100,000.

In conventional solution polymerization, the monomers are blended with solvents and a polymerization catalyst and the reaction mixture is heated to 75–150° C. for about 2–6 hours to form a polymer that has the above number average molecular weight.

Typical solvents which are used to prepare the acrylic polymer are toluene, xylene, butyl acetate, acetone, methylisobutyl ketone, methylethyl ketone, butyl alcohol, and other aliphatic cycloaliphatic and aromatic hydrocarbons, esters, ethers, ketone, and alcohols, such as are conventionally used.

About 0.1–4% by weight, based on the weight of the monomers, of a polymerization catalyst is used to prepare the methacrylate polymer. Typical catalysts are di-tertiary butyl peroxide, cumene hydroperoxide, azobisisobutyronitrile and the like.

Typical monomers that can be used to prepare the methacrylate copolymer in the percentages indicated herein are ethyl methacrylate, propyl methacrylate, isopropyl methacrylate, butyl methacrylate, pentyl methacrylate, hexyl methacrylate, 2-ethylhexyl methacrylate, nonyl methacrylate, decyl methacrylate, lauryl methacrylate. Preferred are butyl methacrylate and lauryl methacrylate.

The hydroxyl containing acrylic copolymer is not compatible with the polymethyl methacrylate, or the methacrylate copolymer and in the resulting finish, discrete areas of the copolymer can be detected. This polyblend structure provides the finish with its excellent physical properties.

The hydroxyl containing acrylic copolymer can be prepared by the aforementioned conventional solution polymerization, by emulsion polymerization or by bead polymerization techniques.

In conventional solution polymerization, the monomers are blended with the above solvents and polymerization catalysts and the reaction mixture is heated under the above conditions to form a copolymer that has a number average molecular weight of about 20,000–40,000.

In the preparation of the acrylic copolymer by standard emulsion polymerization, the monomers, suitable emulsification or suspension agent (surfactants), and a free radical catalyst are charged into a polymerization vessel containing water. The polymerization is carried out in a closed vessel, and preferably, under an inert atmosphere, utilizing polymerization temperatures of about 20–90° C. Typical free radical catalysts that can be used are as follows: potassium persulphate, the peroxides, such as hydrogen peroxide, a diazo compound, such as azobisisobutyroamidine hydrochloride or a redox type, such as per sulphate or per sulphite, or mixtures of these catalysts.

Preparation of acrylic copolymers by suspension or bead polymerization techniques is described in W. R. Sorenson and T. W. Campbell, Preparative Methods of Polymer Chemistry, Interscience Publishers, New York, 2nd ed. 1968, page 254.

The following are typical monomers that can be used in accordance with the percentages indicated herein to prepare the acrylic copolymer of the powder coating composition of this invention: methyl methacrylate in combination with an alkyl methacrylate, having 2–12 carbon atoms in the alkyl group, such as ethyl methacrylate, propyl methacrylate, isopropyl methacrylate, butyl methacrylate, isobutyl methacrylate, hexyl methacrylate, 2-ethylhexyl methacrylate, decyl methacrylate, lauryl methacrylate, and the like; or an alkyl acrylate having 1–12 carbon atoms in the alkyl group, such as methyl acrylate, ethyl acrylate, propyl acrylate, butyl acrylate, pentyl acrylate, hexyl acrylate, 2-ethylhexyl acrylate, octyl acrylate, decyl acrylate, lauryl acrylate, and the like; a hydroxyalkyl acrylate or methacrylate, such as hydroxyethyl acrylate, hydroxypropyl acrylate, hydroxybutyl acrylate, hydroxyethyl methacrylate, hydroxypropyl methacrylate, hydroxybutyl methacrylate, and the like. The acrylic copolymers contain 0.1–5% by weight of an $\alpha,\beta$-ethylenically unsaturated carboxylic acid, such as methacrylic acid, acrylic acid, ethacrylic acid, itaconic acid, and the like.

Organic plasticizers are used in a novel powder coating composition of this invention in the amount of 15–30% by weight based on the weight of the powder coating composition. The plasticizer should be chosen to provide the powder particles with the aforementioned glass transition temperature and give the resulting finish a glass transition temperature of 40–60° C. The free hydroxyl content of the plasticizer is from 0 to 2.0% by weight.

Monomeric and polymeric plasticizers can be used in the novel powder coating composition of this invention. Phthalate ester plasticizers in particular the alkyl ester phthalates in which the alkyl group has 2–10 carbon atoms can be used, such as diethyl phthalate, dibutyl phthalate, didecyl phthalate, di-2-ethylhexyl phthalate and mixtures thereof, adipate esters, such as di-isonoyl adipate, can also be used.

Polyester resins can also be used as plasticizers. Typical polyesters are, for example, alkylene glycol esters of adipic and benzoic acid, such as ethylene glycol adipate benzoate, neopentyl glycol adipate benzoate, ethylene glycol adipate benzoate phthalate, and the like. Plasticizers of oil-free or oil-modified alkyl resins and polyesters and epoxidized soya bean oil can also be used.

Mixtures of the above polymeric plasticizers and monomeric plasticizers can be used, such as a mixture of ethylene glycol adipate benzoate and diethyl phthalate, neopentyl glycol adipate benzoate and dibutyl phthalate, and the like.

The following blends of film-forming constituents form useful powder coating compositions:

(1)

50–60% by weight of methyl methacrylate, and
10–20% by weight of an acrylic copolymer of 50–80% by weight of methyl methacrylate; 10–40% by weight of butyl methacrylate; 5–15% by weight of hydroxyethyl acrylate; and 1–2% by weight of methacrylic acid or acrylic acid, and
25–30% by weight of a plasticizer of an alkyl phthalate having 2–10 carbon atoms in the alkyl group, an alkylene glycol adipate, an alkylene glycol adipate benzoate or mixtures thereof;

(2)

50–60% by weight of polymethyl methacrylate, and
10–20% by weight of an acrylic copolymer of 50–55% by weight of methyl methacrylate, 35–40% by weight of butyl methacrylate; 8–12% by weight of hydroxyethyl methacrylate; 1–3% by weight of acrylic acid or methacrylic acid; and
25–30% by weight of a plasticizer of neopentyl glycol adipate and didecyl phthalate; and (3)

50–60% by weight of polymethyl methacrylate, and
10–20% by weight of an acrylic copolymer of 70–80% by weight of methyl methacrylate; 10–20% by weight of butyl methacrylate; 5–10% by weight of hydroxyethyl methacrylate; 1–3% by weight of methacrylic acid or acrylic acid; and
25–30% by weight of a plasticizer of neopentyl glycol adipate benzoate and didecyl phthalate.

To the above blends of film-forming constituents about 0.5–3% by weight of a cross-linking agent is added. An alkylated melamine formaldehyde can be used. Useful alkylated melamine formaldehyde resins have 1–8 carbon atoms in the alkyl group. For example, wholly or partially methylated or butylated, melamine formaldehyde resins can be used. Hexamethoxymethyl melamine is one preferred resin.

A blocked polyisocyanate cross-linking agent can be utilized to form the novel powder coating composition of this invention. Any polyisocyanate that can be reacted with another chemical compound to form a thermally unstable reaction product can be utilized. This reaction product (blocked polyisocyanate) must be stable below 50° C. for long periods of time and must be compatible with the polymer used to form the powder coating composition. However, this product must break down under moderate baking conditions, for example, of 125–200° C. to form a polyisocyanate with reactive isocyanate groups that will cross-link with the polymer of the novel powder.

Typical blocking agents that can be used to form the block polyisocyanate cross-linking agent used in the powder coating composition of this invention are, for example, phenol compounds, alcohols, such as tertiary butyl alcohol, ketoximes, hindered glycol esters, caprolactam and the like. Typical phenol compounds that can be used are phenol, propyl phenol, tertiary butyl phenol, nonyl phenol, other monohydric phenols, bromo phenol, 2-chloro phenol, dichloro phenol, lithoxy phenol, 2-methoxy nitrophenol and the like. Preferably, ketoximes are used as blocking agents for the polyisocyanate used in this invention. Some preferred ketoximes are, for example, acetoxime, methyl ethyl ketoxime, diisobutyl ketoxime and the like.

The following polyisocyanates when blocked with one of the aforementioned blocking agents are useful in forming the novel powder coating composition of this invention.

propylene-1,2-diisocyanate,
butylene-1,2-diisocyanate,
butylene-1,3-diisocyanate,
hexamethylene diisocyanate,
octamethylene diisocyanate,
nonamethylene diisocyanate,
decamethylene diisocyanate,
2,11-diisocyano-dodecane,
2,2'-methylene-bis-(cyclohexyl isocyanate),
3,3'-methylene-bis-(cyclohexyl isocyanate),
4,4'-methylene-bis-(cyclohexyl isocyanate),
4,4'-ethylene-bis-(cyclohexyl isocyanate),
4,4'-propylene-bis-(cyclohexyl isocyanate),
bis-(para-isocyano-cyclohexyl)sulfide,
bis-(para-isocyano-cyclohexyl)sulfone,
bis-(para-isocyano-cyclohexyl)ether,
bis-(para-isocyano-cyclohexyl)diethyl silane,
2,2-dimethyl propylene diisocyanate,
3-methoxy-hexamethylene diisocyanate,
2,5-dimethyl heptamethylene diisocyanate,
5-methyl-nonamethylene diisocyanate,
1,4-diisocyano-cyclohexane,
1,2-diisocyano-octadecane,
2,5-diisocyano-1,3,4-oxadiazole,
$OCN(CH_2)_3O(CH_2)_2O(CH_2)_3NCO$,
$OCN(CH)_3S(CH_2)_3NCO$ and
$OCH(CH_2)_3N(CH_2)_3NCO$.

polymethylene polyphenyl isocyanate

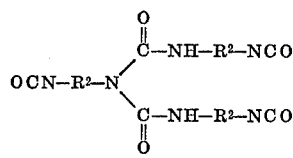

where $R^2$ is an alkylene group having 1–6 carbon atoms, especially preferred is this polyisocyanate blocked with a ketoxime, such as methylethyl ketoxime;

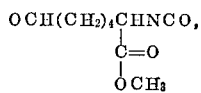

and

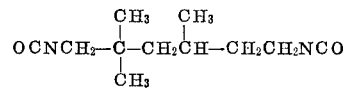

A silicone resin can be added to the novel powder coating composition of this invention to enhance flow and reduce cratering. Any of the conventional silicon resins or oils in amounts of 0.01–2% by weight can be used for this purpose.

Generally pigments are used in a powder coating composition of this invention in amounts of 0.2–50% by weight of the powder particles. Examples of the great variety of pigments which can be used in the novel powder coating composition of this invention are metallic oxide, preferably titanium dioxide, zinc oxide, iron oxide, and the like, metallic flake, metallic powders, metal hydroxides, chromates, such as lead chromate, sulfides, sulfates, carbonates, carbon black, silica, talc, china clay, and other pigments, oragnic dyes and lakes. The additional pigments generally increase the melt viscosity of the powder particles, therefore, the melt viscosity of the film-forming constituents is determined on an unpigmented composition.

The novel powder coating composition of this invention can be prepared by a variety of techniques. For example, the plasticizers and pigments can be blended with the polymer solution or emulsion. This mixture can then be sprayed into a vacuum evaporator which flashes off the solvent or the water and leaves spherical powder particles. Commercial spray drying equipment can be used for this technique.

In another technique, the ingredients can be blended together, that is, the polymer solution or emulsion, the plasticizer and the pigments are passed into a vacuum extruder. The extruder is operated under a vacuum of 2–25 inches of mercury, preferably 10–15 inches of mercury, and the solvent or water is removed from the composition and 100% solids extrudate is produced. The extrudate is then reduced to a powder using conventional grinding equipment, for example, a pin disc mill, a fluid energy mill or a hammer mill can be used.

The polymethyl methacrylate and the acrylic copolymer can be dry blended and then mixed with the plasticizer and a mill base and ground. The acrylic copolymer may be introduced through the mill base or through pigmented chips containing the copolymer.

After grinding the powder is passed through a sieve to remove any large particles. Usually a 200-mesh sieve is used.

The novel powder coating composition of this invention is then applied to a metal, glass, plastic or fiber reinforced plastic substrate by electrostatic spraying techniques or by using a fluidized bed or an electrostatic fluidized bed. Preferably, electrostatic spraying is utilized in which the voltage of 20 to 50 kilovolts is applied to the gun. The composition is applied in several passes to a thickness of 0.5–6 mils, preferably 2–3 mils, and then baked at 125–200° C. for 5–15 minutes. Optionally, the finish may be sanded and then rebaked for 15–45 minutes at 125–225° C. to provide a mirror-like finish.

Preferably, the novel coating composition of this invention is applied over a suitable treated and primed metal substrate. Typical alkyd primers or epoxy primers pigmented with iron oxide, carbon black, titanium dioxide and the like can be used. Also, the novel composition can be used directly over galvanized steel to form a durable coating. A sealer coat may be used over the primer coat to provide a particularly smooth and even surface over which the novel coating composition is then applied. Typical sealer compositions that can be used are disclosed in Rohrbacher U.S. 3,509,086, issued Apr. 28, 1970. An electrically conductive carbon black pigment can be added to the primer and/or sealer to make the surface conductive and promote uniform deposition of the powder while spraying.

Electrodeposited primers can be used on the metal substrate. Typical electrodeposited primer compositions have as the film-forming constituents about 50–95% by weight of a carboxylic acid polymer having an acid number of 5–200 and correspondingly about 5–50% by weight of a cross-linking agent. Generally, an electrically conductive sealer coat also is applied to these primers as indicated above.

The following are examples of carboxylic polymers used in these primer compositions; maleinized drying oils which are the reaction products of maleic anhydride and a drying oil, such as linseed oil, dehydrated castor oil, tung oil, soyabean oil and the like; alkyd resins which are the reaction products of a polyhydric alcohol and a polybasic acid, such as drying oil fatty acids; esterified epoxy resins, such as an epoxy-hydroxy polyether resin esterified with conventional drying oil fatty acid which can be further acidified with maleinized drying oils; acrylic polymers; polyesters; trimellitic anhydride alkyd resins; styrene/allyl alcohol copolymers reacted with a carboxylic acid constituent and the like.

The following are typical cross-linking agents used with the above carboxylic polymers to form conventional primers and primers that can be electrodeposited: melamine formaldehyde, alkylolated melamine formaldehyde, urea formaldehyde, benzoguanamine formaldehyde, melamine toluene sulfonamide resins; one preferred cross-linking agent is hexamethoxy methylol melamine. Other cross-linking agents, such as amines and other compatible hydroxyl terminated compounds can also be used.

The following examples illustrate the invention. All quantities are on a weight basis unless otherwise indicated.

EXAMPLE 1

The following ingredients are blended together:

| | Parts by weight |
|---|---|
| Polymethylmethacrylate solution (25% solids of polymethylmethacrylate having a weight average molecular weight of 100,000 in a 2/1 solvent blend of toluene/acetone) | 200.00 |
| Acrylic copolymer solution (50% solids of a methyl methacrylate/butylacrylate/hydroxyethylacrylate/methacrylic acid polymer weight ratio 51.5/37/10.0/1.5 having a number average molecular weight of 30,000) | 36.00 |
| Plasticizer solution (90% solids in a hydrocarbon solvent of a neopentyl glycol adipate benzoate plasticizer having an acid no less than 3) | 11.00 |
| Didecyl phthalate | 20.00 |
| Hexamethoxymethyl melamine | 1.00 |
| Para toluene sulfonic acid | 0.01 |
| Total | 268.01 |

The above composition is then charged into a vacuum extruder which is held at 150–170° C. and a vacuum of 10–15 inches of mercury is applied to remove the solvent. The extrudate essentially free of solvent is quenched with water and taken from the extruder and charged into a pelletizer which forms the extrudate into ⅛-inch particles. These particles are then fed into a pin disc mill which reduces the particle size to about 75–150 microns. These particles are then charged into a "Vortec" fluid energy mill and ground into small diameter particles and the powder then is passed through a 200 mesh sieve (74 microns).

The resulting powder has a glass transition temperature of 40° C. The melt viscosity of the unpigmented powder is about 15,000 to 25,000 poises at 160° C.

The powder is charged into a holding tank of an electrostatic spray gun. A Gema Gun is used for application of the powder applying about 35 kilovolts. The powder is applied to phosphatized steel panels and to panels coated with a standard alkyd resin primer. A coating of powder is applied with the gun giving a coating about 2–3 mils thick. The panels are then baked for 15 minutes at 175° C. and sanded with a No. 600 grit paper. A final bake of 175° C. for 30 minutes is then given to the panels.

The resulting panels have an excellent appearance and good physical properties. The panels have a craze-free temperature of slightly less than 30° C., a print-free temperature of 135° C. and acceptable cold crack resistance.

EXAMPLE 2

The following ingredients are blended together:

| | Parts by weight |
|---|---|
| Polymethylmethacrylate solution (described in Example 1) | 240.00 |
| Acrylic copolymer solution (described in Example 1) | 16.00 |
| Plasticizer solution (described in Example 1) | 11.00 |
| Neopentyl glycol adipate | 10.00 |
| Didecyl phthalate | 10.00 |
| Hexamethoxymethyl melamine | 1.00 |
| Para toluene sulfonic acid | 0.01 |
| Total | 288.01 |

A powder coating composition is prepared using the procedure of Example 1. The powder particles have a glass transition temperature of 33 to 38° C. The melt viscosity of the pigmented powder is 45,000 poises at 160° C.

The powder is applied with an electrostatic spray gun using the identical conditions as in Example 1. The powder is applied to phosphatized steel panels and steel panels coated with a standard alkyd resin primer. The panels are baked and sanded/baked using the same procedure as Example 1. The resulting panels have an excellent appearance and good physical properties. The panels have a craze-free temperature of 38° C. and a print-free temperature of 140° C. and acceptable cold crack resistance.

The invention claimed is:

1. A thermoplastic acrylic polymer powder coating composition comprising finely divided particles having a particle size of 1–75 microns; wherein the powder particles are an intimately mixed blend of film-forming constituents that consists essentially of
    (A) 50–74.5% by weight, based on the weight of the film-forming constituents, of polymethylmethacrylate or a methacrylate copolymer consisting essentially of 90–98% by weight, based on the weight of the copolymer, of methyl methacrylate and correspondingly 2–10% by weight of an alkyl methacrylate having 2–12 carbon atoms in the alkyl group or a blend of polymethyl methacrylate and the methacrylate copolymer; wherein the polymethyl methacrylate and the methacrylate copolymer have a number average molecular weight of about 65,000–100,000;
    (B) 10–20% by weight, based on the weight of the film-forming constituents, of a hydroxyl containing acrylic copolymer consisting essentially of
        (1) 50–85% by weight, based on the weight of the copolymer, of methacrylate;
        (2) 9.5–40% by weight, based on the weight of the copolymer, of an alkyl methacrylate having 2–12 carbon atoms in the alkyl group or an alkyl acrylate having 1–12 carbon atoms in the alkyl group;
(3) 0.5–6% by weight of a hydroxy alkyl acrylate or a hydroxy alkyl methacrylate having 2–4 carbon atoms in the alkyl groups;
(4) 0.1–5% by weight of an α,β-ethylenically unsaturated carboxylic acid selected from the group consisting of acrylic acid, methacrylic acid, itaconic acid and ethacrylic acid;
wherein the hydroxyl containing acrylic copolymer has a number average molecular weight of about 20,000–40,000,
(C) 15–30% by weight of an organic plasticizer selected from the group consisting of an alkyl phthalate ester having 2–10 carbon atoms in the alkyl group, an alkylene glycol adipate benzoate ester, an alkylene glycol adipate or mixtures thereof;
(D) 0.5–3.0% by weight of a cross-linking agent of an alkylated melamine resin having 1–8 carbon atoms in the alkyl group;
wherein the film-forming constituents have a melt viscosity of 5,000–60,000 measured at 160° C. and a glass transition temperature of about 30–60° C. and wherein the constituents (A), (B), (C) and (D) total 100%.

2. The powder coating compositions of claim 1 in which the particle size is 20–50 microns and the film-forming constituents have a glass transition temperature of 30–45° C.

3. The powder coating composition of claim 2 containing about 0.2–50% by weight of pigment.

4. The powder coating composition of claim 3 in which the cross-linking agent of an alkylated melamine resin is hexamethoxymethyl melamine.

5. The powder coating composition of claim 4 in which the film-forming constituents consist essentially of
(A) 50–60% by weight of polymethyl methacrylate, and
(B) 10–20% by weight of an acrylic copolymer of 50–80% by weight of methyl methacrylate; 10–40% by weight of butyl methacrylate; 5–15% by weight of hydroxyethyl acrylate; and 1–2% by weight of methacrylic acid or acrylic acid; and
(C) 25–30% by weight of a plasticizer that is either an alkyl phthalate ester having 2–10 carbon atoms in the alkyl group, an alkylene glycol adipate, and and alkylene glycol adipate benzoate, or mixtures thereof.

6. The powder coating composition of claim 4 in which the film-forming constituents consist essentially of
(A) 50–60% by weight of polymethyl methacrylate, and
(B) 10–20% by weight of an acrylic copolymer of 70–80% by weight of methyl methacrylate; 10–20% by weight of butyl methacrylate; 5–10% by weight of hydroxyethyl methacrylate; and 1–3% by weight of methacrylic acid, and
(C) 25–30% by weight of a plasticizer of neopentyl glycol adipate benzoate and didecyl phthalate.

7. The powder coating composition of claim 4 in which the film-forming constituents consist essentially of
(A) 50–60% by weight of polymethyl methacrylate, and
(B) 10–20% by weight of an acrylic copolymer of 50–55% by weight of methyl methacrylate; 35–40% by weight of butyl methacrylate; 8–12% by weight of hydroxyethyl methacrylate; and 1–3% by weight of acrylic acid or methacrylic acid; and
(C) 25–30% by weight of a plasticizer of neopentyl glycol adipate and didecyl phthalate.

8. A metal substrate coated with 0.1–5 mil thick coalesced layer of the coating composition of claim 1.

References Cited
UNITED STATES PATENTS

| | | | |
|---|---|---|---|
| 2,940,950 | 6/1960 | Gusman | 260—901 |
| 3,039,987 | 6/1962 | Elbling | 260—37 |
| 3,222,419 | 12/1965 | Jubilee et al. | 260—901 |
| 3,249,463 | 5/1966 | Carlee | 260—901 |
| 3,579,610 | 5/1971 | Petropoulos et al. | 260—901 |
| 3,660,136 | 5/1972 | Guilbault et al. | 117—17 |

OTHER REFERENCES

D. N. Buttrey: Plasticizers (Cleaver-Hume, 1957), pp. 9, 10, 172, TP 986 A2 B9 P. 1957 C. 4.

MORRIS LIEBMAN, Primary Examiner

T. DeBENEDICCTIS, Sr., Assistant Examiner

U.S. Cl. X.R.

260—31.8 M, 31.8 R, 31.8 T, 851, 885, 901